United States Patent [19]

Wolinski et al.

[11] 4,044,176
[45] Aug. 23, 1977

[54] GRAPHIC ARTS AND GRAPHIC MEDIA

[75] Inventors: Leon E. Wolinski, Cheektowaga; Arthur R. Endress, Hamburg, both of N.Y.

[73] Assignee: Pratt & Lambert, Inc., Buffalo, N.Y.

[21] Appl. No.: 586,249

[22] Filed: June 12, 1975

Related U.S. Application Data

[60] Continuation-in-part of Ser. No. 378,704, July 12, 1973, abandoned, which is a continuation-in-part of Ser. No. 342,744, March 19, 1973, Pat. No. 3,864,181, which is a division of Ser. No. 259,656, June 5, 1972, abandoned, which is a continuation-in-part of Ser. No. 122,086, March 8, 1971, abandoned.

[51] Int. Cl.² .............................................. B05D 5/00
[52] U.S. Cl. .................................. 427/256; 260/2.5 B; 427/373; 427/379; 427/385 R; 428/159; 428/161; 428/206; 428/307; 428/327; 428/407
[58] Field of Search ............... 428/913, 402, 407, 327, 428/158, 159, 306, 307, 161, 147, 206, 207, 403, 165; 260/2.5 B; 427/214, 222, 180, 197, 198, 256, 373, 379, 385 R; 252/316

[56] References Cited

U.S. PATENT DOCUMENTS

| | | | |
|---|---|---|---|
| 2,797,201 | 6/1957 | Veatch et al. | 260/2.5 B |
| 2,885,303 | 5/1959 | Kaplan | 260/2.5 B |
| 2,945,776 | 7/1960 | Longuisti et al. | 260/2.5 B |
| 3,043,045 | 7/1962 | Martuck | 260/2.5 B |
| 3,219,600 | 11/1965 | Rucker | 260/2.5 B |
| 3,353,981 | 11/1967 | Jacob | 260/2.5 B |
| 3,359,130 | 12/1967 | Goldman | 260/2.5 B |
| 3,379,799 | 4/1968 | Goldman | 260/2.5 B |
| 3,466,353 | 9/1969 | Turner | 260/2.5 B |
| 3,515,569 | 6/1970 | Walters | 260/2.5 B |
| 3,615,972 | 10/1971 | Morehouse, Jr. et al. | 260/2.5 B |
| 3,906,123 | 9/1975 | Vincent et al. | 428/411 |

*Primary Examiner*—George F. Lesmes
*Assistant Examiner*—Stanley S. Silverman
*Attorney, Agent, or Firm*—Christel & Bean

[57] ABSTRACT

Graphic arts media are provided which offer raised, three-dimensional effects. A basic medium is formulated of a colorant, film-forming binder, a solvent vehicle and thermally expandable microspheres. The microspheres are treated to preclude or inhibit solvation in the solvent vehicle by coating with a compound which is a non-solvent for the microspheres but which preferentially wets the surface thereof. Alkyl alcohols having about 3 to 5 carbon atoms in the alkyl chain are employed.

The medium is selectively applied to a substrate, dried, and heated to expand the microspheres.

12 Claims, No Drawings

GRAPHIC ARTS AND GRAPHIC MEDIA

This application is a continuation-in-part of copending application Ser. No. 378,704, now abandoned, filed July 12, 1973 as a continuation-in-part of copending application Ser. No. 342,744 filed Mar. 19, 1973 as a division of application Ser. No. 259,656 filed June 5, 1972 as a continuation-in-part of preceding application Ser. No. 122,086 filed Mar. 8, 1971, said applications Ser. Nos. 122,086 and 259,656 now being abandoned and said application Ser. No. 342,744 now U.S. Pat. No. 3,864,181 dated Feb. 4. 1975.

The present invention relates to three-dimensional graphic arts, fine arts, printing, decorating the like. More particularly, it relates to a method of forming three-dimensional graphic designs and the like on a substrate, the three-dimensional representations and forms produced thereby, and compositions employed in the method. Still more particularly, the present invention relates to compositions of matter for use in the formation of three-dimensional designs, printing, and the like, the method of forming such three-dimensional graphic designs, printing, and the like, and the three-dimensional designs formed by such method.

A wide variety of compositions are employed in the graphic arts in order to obtain diverse optical effects. Yet there is always wide-spread demand for new compositions and new techniques which can increase the store of effects available to those of skill in such arts. While many of the compositions and techniques have been known for centuries and yet still find wide spread usage, the field of graphics is quite a dynamic art, whatever particular branch thereof is considered. As employed in the present application, the term "graphic arts" is used in a broad sense to include fine arts, commercial art, decorative arts, related arts such as printing and the like. Also included are photography and related arts. In particular, the term "graphic arts" as employed herein can be generalized to include all those arts which involve the formation of a graphic representation or decorative pattern or the like upon a substrate. Particular examples include such diverse, but interrelated, subdivisions as painting, drawing, lithography, silk-screening, photolithography, wood-cuts, stencilling, printing, wall-paper manufacture, photography, xerography and various combinations of such arts with one another and with still other arts, e.g., sculpture, wood-carving, molding, ceramics and the like.

It is an object of the present invention to provide compositions for use in the graphic arts for the formation of raised or three-dimensional graphic representations, a method of forming such representations, and the representations so formed.

Another object of the present invention is to provide such compositions in such form that the raised or three-dimensional character is attained after the graphic representation is applied to a substrate, enabling the practitioner of the art to utilize conventional and well-known techniques to apply the graphic medium to the substrate and thereafter attain the raised or three-dimensional character.

Still another object is to provide the compositions of the present invention in such form that its utilization can be integrated with conventional procedures, techniques, processing equipment and apparatus without modification thereof and subsequently further treating the compositions to achieve the raised or three-dimensional effect. These and still other objects, as will hereinafter become apparent, are attained by the present invention.

It has been found that raised or three-dimensional graphic effects can be attained by incorporating into graphic media a minor amount of thermally expandable microspheres, selectively applying such media to a substrate by the applicable techniques therefor, and thereafter heating the selectively coated substrate to expand the microspheres. The expansion thus attained creates a raised or three-dimensional result which can be characterized as a continuous matrix of the medium employed, containing a disperse phase of expanded microspheres.

The graphic media to which the present invention is applicable can be generally defined as any of the diverse media which can be characterized by the formation of a substantially continuous film from a solution where selectively applied to a substrate, and in which the microspheres can be incorporated as a disperse phase. Such graphic media include, by way of example, paints, inks, laquers, enamels, photographic emulsions and the like. In the more common cases, such media include a solvent vehicle, a pigment, or the equivalent, and a binder which is capable of forming a substantially continuous solid film upon the chosen substrate and often include a wide variety of other materials, such as one or more of the following: diluents, opacifiers, fillers, extenders, leveling agents, flow promoters, plasticizers, driers, cross-linking agents, thermal and/or ultraviolet light stabilizers, thixotropic agents, viscosity control agents, wetting agents, dispersing aids, gloss control agents, and the like.

As employed herein, the term "pigment" is intended to be inclusive of that class of materials which may be employed to impart color properties to a graphic medium or media. As such, it is intended to include not only literal pigments, but also dyes, lakes, and like materials, and precursors thereof as well, as is the case in photographic procedures.

The solid film-forming binder will most often be a natural or synthetic polymer material dissolved in a solvent therefor which, upon evaporation of the solvent or reaction thereof, results in the formation of a substantially continuous adherent film. In other cases, the binder may be a liquid or semi-solid polymer precursor, i.e., monomer or "pre-polymer" which reacts in situ to provide the film-forming polymer. In such cases, polymerization catalysts may also be included. A solvent or thinner will be required or desired in such systems. The polymeric film-forming binding can be thermoplastic or thermosetting. Mixtures of polymers may be used as well as single materials.

Such graphic arts media are well known to those of ordinary skill in the art and are not per se a part of the present invention. It is accordingly not intended that the invention be construed as limited narrowly to specific media or to particular categories thereof. Nor should the invention be limited with regard to component ingredients of such media except as herein defined.

In accordance with the present invention, expandable microspheres are dispersed into the graphic medium. The microspheres employed in the present invention are hollow thermoplastic particles and are of relatively small size, usually less than from about 200 to 300 microns in diameter and can be as small as about 0.5 microns in diameter. Preferably micron diameters of from about 3 to 50, and more preferably about 5 to 20, are employed. The microspheres have a generally spherical shape and define a generally concentric spherical cavity inside containing about 5 to 50 weight percent of a volatile blowing agent, insoluble or at most only slightly soluble in the thermoplastic material of the microsphere. Microspheres of such character can be prepared with bulk densities ranging from about 50 to 90 pounds per cubic foot. The thermoplastic of the microspheres can be generally any thermoplastic polymer but since the formation of a solution coating composition is contemplated, the thermoplastic of the microspheres should be different from the foamable coating polymer and insolubilized in the solvent vehicle as herein after described.

The microspheres can be conveniently prepared by the techniques referred to as a "limited coalescence" polymerization technique. A typical preparation of such particles is as follows:

A polymerization reactor equipped with an agitator is charged with 100 parts by weight of deionized water and 15 parts by water of a 30 weight percent colloidal silica dispersion in water. The colloidal silica dispersion is 30 weight percent solids and is available under the tradename of "Ludox HS." To this mixture is added 2.5 parts by weight of a 10 weight percent aqueous solution of a copolymer prepared from diethanol amine and adipic acid in equimolar proportions by carrying out a condensation reaction to give a product having a viscosity of about 100 centipoises at 25° C. One part by weight of a solution containing 2.5 weight percent potassium dichromate is added. The pH of the aqueous solution is adjusted to 4 with hydrochloric acid. Vinylidene chloride is utilized as the monomer. An oil phase mixture is prepared by utilizing 100 parts by weight of vinylidene chloride and 20 parts by weight neopentane (27.6 volume percent based on the total volume of the monomer-neopentane mixture) and 0.1 part by weight of benzoyl peroxide as a catalyst. The oil phase mixture is added to the water phase with violent agitation supplied by a blade rotating at a speed of about 10,000 rpm. The reactor is immediately sealed and a portion sampled to determine the particle size. The droplets appear to have diameters of from 2 to about 10 microns. After the initial dispersion, the reaction mixtures are maintained at a temperature of about 80° C. for a period of 24 hours. At the end of this period, the temperature is lowered and the reaction mixture is found to have the appearance of a white, milky liquid similar to a chalk-white milk. A portion of the mixture is filtered to remove the particles and the particles or beads are subsequently dried for about one hour in the air oven at a temperature of about 30° C. A portion of the dried spherical particles are heated in an air oven at a temperature of 150° C. for about 3 minutes. Upon heating, the particles show a marked increase in volume. Microscopic examination of the particles prior to foaming indicates particles having diameters of from about 2 to about 10 microns and having disposed therein a distinct spherical zone which appears to contain liquid and a small vapor space. The particles which are heated are examined microscopically and are found to have diameters of from about 2 to 5 times the diameter of the original particles and to have a relatively thin, transparent wall and a gaseous center, i.e., a monocell.

Preferred polymers for preparation of the microspheres are for example, polyvinylidene chloride, a copolymer of vinylidene chloride and acrylonitrile in weight ratios of about 100:1 to about 70:30, copolymers of acrylonitrile and methyl acrylate in weight ratios of from about 90:10 to 80:20, and copolymers of methacrylonitrile and methyl acrylate in weight ratios of about 93:7 to 82:18. While these materials and proportions are preferred, it is not intended that the invention be limited thereto. The preference is grounded principally in convenience and not in any substantive considerations.

By utilizing the technique of limited coalescence, a wide variety of expandable thermoplastic microspheres can be produced and, if desired, may be specifically designed for incorporation into a specific graphic medium. Such materials are now generally familiar and are commercially available. The term "microspheres" is herein employed as generic to all such materials.

In the present invention, the microspheres are incorporated into the graphic medium in unexpanded form as a disperse phase. In order to preserve the expandable character of the microspheres, it it important that no component of the medium have any substantial solvent effective upon the thermoplastic of the spheres, and as a consequence, the microspheres are treated to preclude or retard solvation. The microspheres are coated with a material which preferentially wets the surface of the microspheres but which is not a solvent. Materials which meet this requirement within the scope of the present invention are alkyl alcohols of three to five carbon atoms. These compounds are compatible with solvent based graphic media and will preferentially wet the surface of poly(vinylidene chloride) microspheres but have no measurable solvent activity thereupon. Butyl alcohols, particularly n-butyl alcohol, are preferred for such purpose when the thermoplastic of the microspheres is poly(vinylidene chloride).

The alkyl alcohols are readily applied to the microspheres by a variety of procedures, the simplest and most convenient of which may be selected as desired. Generally, the microspheres and the alkyl alcohol will be simply combined and mixed, e.g., by stirring or tumbling or the like. The relative proportions are not narrowly significant, so long as sufficient alkyl alcohol is employed to form a complete wetting of the microsphere surfaces. Generally about 0.5 weight percent, based on the weight of the microspheres is sufficient, but it is prudent to employ somewhat greater amounts, and at least about 1.0 weight percent, based on the weight of the microspheres, is a preferably lower limit, and about 5.0 weight percent, similarly based, is still more preferred. Particularly when the graphic medium contains a vehicle which is a strong solvent for poly(vinylidene chloride). There is no effective upper limit to the amount of the alkyl alcohol until the amount becomes so large as to significantly alter the properties of the graphic medium. Ordinarily such amounts will be so far in excess of the requirements of the present invention as to be economically unattractive. Amounts of as much as 100 weight percent, based on the weight of the microspheres, will generally not appreciably alter the graphic medium and is acceptable, but lesser amounts, not more than about 20 weight percent, based on the weight of the microspheres will generally be preferable.

The microspheres may be incorporated into the graphic media at any convenient stage, that is, during the formulation of such media or at a later time up to just prior to use. A wide variety of processing techniques can be employed to effect dispersion of the microspheres, which are readily wetted out in most media and, because of the extremely small dimensions of the particles, are readily mixed. In most contexts, a thorough, uniform dispersion is desired, which is attained without difficulty by a simple mixing procedure. Unusual special effects may be attained by incomplete dispersion of the microspheres, and when such effects are desired, less than thorough mixing may be employed.

Depending upon the particular technique of application to be employed with the graphic medium, it may be desirable to use an inert or solvent diluent to adjust the viscosity of the medium to compensate for the addition of the microspheres. When the microsphere-modified medium requires such adjustment, it may be cut or thinned in accord with conventional practice applicable to the particular graphic medium employed. When formulated in accordance with the foregoing, the graphic media will have a shelf life and a storage stability usual for the particular medium employed.

Graphic media formulated in accordance with the present invention may be applied to a substrate by any of the known and conventional techniques appropriate thereto. Such techniques commonly include, for example, brushing, trowelling, spraying, pouring, dip-coating, printing, silk-screening, stencilling, electrostatic techniques and the like. All these techniques share in common the selective application of a graphic medium to a substrate, and all such techniques are contemplated herein. Also contemplated are analogous techniques which involve a uniform application to a substrate, followed by the selective removal of portions of the medium. Such procedures are characteristic of photographic techniques, for example. Because of the finely divided nature of the microspheres, there is no impediment to any of the foregoing techniques attributable to the disperse phase.

The three-dimensional effect which characterizes the graphic media of the present invention is attained by heating the medium to a temperature at which the microspheres expand, usually on the order to about 90°–150° C., more often about 100°–120° C. The degree to which the applied medium expands to attain the raised effect is dependent primarily upon the concentration of the microspheres therein. While some expansion is attained with concentrations of less than one percent based on the total non-volatile content of the medium, the more usually desired effects will require greater concentrations, up to as much as about 45 weight percent microspheres. If greater amounts of microspheres are employed, adherence of the medium to the substrate may be impaired. Then the film forming ability of some types of vehicle may be insufficient. Most often, the desired raised effect will be attained at a concentration of from about 5 to 40 percent, and preferably about 10 to 30 weight percent, although it should be noted that such concentrations are not ordinarily narrowly significant or critical.

When the graphic medium is based upon a thermoplastic polymeric binder or vehicle, which can be characterized by the formation of a coherent film by the removal of volatiles, the applied medium may be expanded at any convenient time to develop the raised effect. It will generally be preferable to develop after removal of the volatiles, although it is also possible to combine development and volatile removal in a single heat treatment. Indeed, such development can in some contexts facilitate formulation of graphic media with solvents or diluents not readily applicable by virtue of their low volatility and long drying times.

Many graphic media are based on vehicles which cure or cross-link to form permanent, hard films. Still others "cure" by polymerization reactions. Since many, if not most, of the reactions involved proceed at room temperatures, it is usually advisable to develop the raised character of the medium promptly, as expansion of the microspheres may in some cases disrupt the continuity of the film which may be relatively brittle in the case of certain types of binder. In addition, it should be noted that many of the curing reactions are accelerated by heat.

Since the indices of refraction of the binder and the microspheres will not ordinarily be the same, unless particular pains are taken to so formulate the medium, the raised media will not ordinarily be transparent but rather will usually be opaque or translucent. Since transparency is ordinarily undesirable in graphic media, such effect may in fact be quite beneficial, as the expanded microspheres will also serve to enhance the covering or tinting capacity of the medium and may even, in some cases, replace or reinforce the effect of additives employed for such purpose, e.g. opacifiers, such as titanium dioxide, zinc oxide, talc or the like. In the absence of colorant, the medium will have a white appearance or a color attributable to the binder.

The substrate to which the graphic media be applied in accordance with the present invention can by any with which the particular medium is compatible and to which such medium is adherent. Such substrates commonly will include various types and textures of paper, canvas, wood, plastics, metals, stone, plaster, fabrics, draperies, clothing, wall coverings, upholstery (particularly fabrics of such materials as cotton, rayon, rayon-acetate, fiberglass, polyesters, polyacrylates, polyacrylonitrile, polyhydrocarbons, and the like, and including both woven and non-woven fabrics), cement, fiberglass, glass, ceramics, leather. Also contemplated is the application of the media over or in combination with other diverse or similar media.

When the graphic media of the present invention are applied to a substrate and developed by heating to the temperature at which the microspheres expand, the applied medium will have a raised and textured surface. The medium becomes a thin film of a syntactic foam which projects outwardly from the surface of the substrate. The thickness of the developed medium will be dependent upon the thickness of application of the medium and upon the concentration of the microspheres therein. The surface will be textured or roughened by the irregularities caused by expansion of the microspheres present just adjacent to the surface of the medium, and the degree of texture will be largely dependent upon the concentration of the microspheres. In circumstances where the rough texture is not desirable, it can be eliminated by an overcoat of a conventional medium without loss of the raised or three-dimensional effect. It is noteworthy that the properties of the developed graphic media of the present invention will be determined by the basic medium formulation employed and will be little altered by the presence of the microspheres except in their function as "foaming agents." Thus, it is apparent that the properties of the developed medium can be tailored to the intended use on the basis of the chemical and physical properties of the components included in the base formulation with emphasis upon the microspheres and their physical and chemical characteristics. In the compositions generally contemplated in the present invention, the developed medium will comprise a continuous phase matrix of the base medium and a disperse phase of the expanded microspheres. Because the expanded microspheres are not contiguous, the medium has a great degree of integrity determined by the cohesiveness of the continuous phase, which in most such media, will be considerable.

While many variations of the present invention are contemplated, the considerable simplicity of the invention and its fundamental concepts enable those of ordinary skill in the graphic arts to implement the practice of the invention with a minimum of specific guidance once the basic nature of the invention is clearly understood. However, it may be informative to refer to the following specific examples which illustrate a few of the numerous facets of graphic technology which can advantageously employ the present invention. These examples are intended to be illustrative only and should not be construed as limiting the scope of the invention, which is defined only by the claims appended hereto.

EXAMPLE I

A gravure press printing ink formulation was prepared by combining and mixing the following components in the indicated proportions:

| Component | Parts by Weight |
|---|---|
| Cyclohexane | 34.30 |
| Toluene | 18.60 |
| Diphenyl octyl phosphate | 0.90 |
| Silicone fluid | 0.45 |
| Butyl methacrylate resin | 25.75 |
| Microspheres | 20.00 |

The formulation thus formed was divided and a variety of colorants were added as noted:

| Sample | Color | Amount, Weight % |
|---|---|---|
| A | None | — |
| B | Carbon black | 4.0 |
| C | Nigrosine black | 4.0 |
| D | Zinc Oxide | 4.0 |
| E | Zinc Oxide/ Prussian blue | 3.95/0.05 |
| F | H Yellow #1 | 4.0 |
| G | H Yellow #1/TiO$_2$ | 2.0/2.0 |
| H | Prussian Blue | 4.0 |
| J | Prussian Blue/ Zinc Oxide | 1.0/3.0 |
| K | Carbon black/ Zinc Oxide | 1.0/3.0 |

Each formation was applied to a plurality of substrates with three different patterned 3-band quadrangular cell cylinder gravure rolls: No. 1 = 120 line, 0.0032 inch cell depth; No. 2 = 150 line, 0.0025 inch cell depth; No. 3 = 180 line, 0.0018 inch cell depth. The substrates employed were aluminum foil, paper-backed aluminum foil, kraft paper, board stock and polyvinyl chloride film. The gravure roll patters of each roll included a line of type, comprising a 10 point bold face Roman type alphabet, a series of straight lines of varying widths, and a plurality of geometric and abstract designs.

After each substrate was printed with each roll and each formulation, the thickness of the unexpanded dried print was examined and measured, the microspheres were expanded at a temperature of about 215° F., and the print again examined and measured.

It was found that, except for color, the results were substantially uniform for each formulation and each substrate. The unexpanded and expanded film thicknesses were:

| Roll | Lines | Unexpanded | Expanded |
|---|---|---|---|
| #1 | 120 | 0.75 mil | 1.50 mil |
| #2 | 150 | 0.50 | 1.00 |
| #3 | 180 | 0.25 | 0.75 |

The unexpanded and expanded print showed excellent clarity and line resolution, while the surface of the expanded print was visibly textured in a fine, irregular pattern. The color of each ink was examined with the following results:

| Sample | Color | Comment |
|---|---|---|
| A | White | milky; poor covering power on foil |
| B | Black | flat appearance |
| C | Black | glossy |
| D | White | somewhat flat; good covering |
| E | White | glossy; white & bright |
| F | Yellow | bright; glossy |
| G | Yellow | pastel; glossy |
| H | Blue | bright; glossy |
| J | Blue | pastel; glossy |
| K | Grey | flat appearance |

With the exception of sample A, all showed good hiding power and excellent tintorial effect. With sample A, poor hiding power was particularly notable on the foil substrate, which contributed a dully, greyish metallic cast to the milky white print.

In the present formulation, the component ingredients were as follows:

The diphenyl octyl phosphate was Monsanto Co. Santizer 141 with a specific gravity 25/25° C. of 1.089 to 1.093 and a Brookfield viscosity of 18 cps at 25° C.

The silicone fluid was Dow Corning Anti-foam A, with a specific gravity of 0.97 at 25/25° C.

The butyl methacrylate resin was duPont Elvacite 2044, with a specific gravity at 25/25° C. of 1.07 and an acid number of zero.

The microspheres were from Dow Corning and were polyvinylidene chloride containing 20 weight percent neopentane. They had a particle size range, unexpanded, of 8 to 20 microns. The micropsheres were coated with 20 weight percent, based on the weight of the microspheres of n-butyl alochol.

EXAMPLE II

A graphic medium similar to that of Example I was prepared in accordance with the following recipe:

| Aromatic hydrocarbon A | 10.35 |
|---|---|
| Aromatic hydrocarbon B | 9.30 |
| Xylene | 21.55 |
| Silicone fluid | 0.55 |
| Diphenyl octyl phosphate | 0.85 |
| Butyl methacrylate resin | 39.80 |
| Microspheres | 17.60 |

The medium was applied by silk-screening onto a glass substrate to provide a decorative pattern. The screen was 300 mesh. The medium was applied in a thickness of 27 mils and was heated to 210° F. which resulted in an expansion to 55 mils. The expanded design was a translucent white having a distinctive three-dimensional finely textured appearance and had a very soft felt-like feel to the touch.

In the foregoing formulation, aromatic hydrocarbon A was Exxon Aromatic 100 having a boiling range of 311° to 344° F. and a specific gravity at 60/60° F. of 0.875. Hydrocarbon B was Exxon Aromatic 150, boiling at 362° to 400° F., specific gravity 0.902 at 60/50° F. The xylene was a petroleum grade with a distillation range of 138° to 143° C. and a specific gravity at 60/60° F. of 0.8702. All other materials were those described in Example I, except that the microspheres of the present Example were coated with 1.0 weight percent n-butyl alcohol.

EXAMPLE III

The following formulation was prepared for silk-screening:

| | |
|---|---|
| Exxon Aromatic Hydrocarbon 150 | 20.5 |
| Toluene | 20.5 |
| Elvax 40 (Ethylene/Vinyl Acetate 60/40) | 17.1 |
| Pre-wet (Microspheres | 11.4 |
| (Butyl Alcohol | 2.4 |

The formulation was silkscreened through a 300 mesh screen onto paper board to form a 20 mil coating. It was dried at 150° F., then expanded at 210° F. to 45 mils to give an adherent, expanded graphic pattern.

The formula was aged for 2 months. The experiment was repeated with the same results.

Another formula was prepared without pre-wetting of the beads with the butyl alcohol. This gave the same initial results, but in 24 hours there was no longer any expansion of coatings due to the attack of the solvents on the vinylidene chloride/copolymer comprising the skin of the microsphere.

EXAMPLE IV

A thermally cross-linkable solution polymer was prepared as follows:

| | |
|---|---|
| Hydroxyethylmethacrylate | 12 |
| 2-ethylhexyl acrylate | 3 |
| Methyl Methacrylate | 25 |
| Toluene | 42 |
| Isopropyl Alcohol | 18 |

Benzoyl peroxide (2%) was used to initiate the polymerization at 80° C. under nitrogen. The 40% solids solution was blended with 3.5 parts of Cymel 370 (a melamine cross-linking agent).

To 100 parts of the above solution, we added a mixture of 33 parts of butyl alcohol and microspheres (20/80). These were mixed thoroughly and applied to a polyester drapery fabric, by a patterned rotogravure roll, 140 lines per inch. The printed fabric was dried 1 minute at 180° F., and heat treated 3 minutes at 300° F. The dried pattern before heat treatment was about 1.5 mils, 3-4 mils after heat treatment, providing a raised, embossed pattern on the fabric.

The mixture was aged and tested in the same manner for 6 months. Results were the same. When non-treated microspheres were used, the ability to form an expanded structure was lost in 1 to 3 days due to the solvent attack on the skin of the microspheres.

EXAMPLE V

A cross-linkable, polymer formulation was prepared as follows:

| | | |
|---|---|---|
| N-Methylolacrylamide (dry) | 8) | 3.2 |
| 2-ethyl hexyl acrylate | 35) | 14.0 |
| Acrylic Acid | 4) | 1.6 |
| Methyl Methacrylate | 40) | 16.0 |
| Butyl Acrylate | 13) | 5.2 |
| Toluene | | 42.0 |
| Isopropanol | | 18.0 |

This was refluxed at 80° C. to polymerize using 5% benzoyl peroxide as the initiator.

Beads were prepared and mixed as in Example IV in the same ratio. They were coated onto:
Cotton
Cotton-Polyester
Rayon
Polyester (Dacron)
Polyacrylonitrile (Orlon)
Fiberglass Fabric
using the same procedure. Each of the fabrics were tested for durability to dry cleaning and washing using the following procedure:

Samples of each fabric were run for five 30-minute cycles in a "Launderometer" at room temperature using a stainless steel container with 100 stainless steel balls using perchloroethylene. To extract the solvent, the samples were placed in a centrifuge tube over a bottom layer of stainless steel balls with acted a reservoir for the solvent and a carrier for the sample. After centrifuging for 15 minutes at high speed, the nearly dry samples were oven dried for 5 minutes at 120° F. No change was noted in the fabric or in the applied pattern after the procedure.

The laundering test consisted of 10 cycles in a commercial Westinghouse automatic washer and tumble drying between wash cycles. The washer utilized hot water at 160° F and one-half cup of "Tide" laundry detergent for each cycle. When appropriate, the washer was ballasted with cotton terry-cloth towels. The drying stage of each cycle was conducted by tumbling in a stream of hot air at 160° F. After the 10 wash-dry cycles, the samples were examined and no change in either fabric or pattern was noted.

The use of beads not protected with butyl alcohol gave expansion in an equivalent fashion if used immediately, but on aging for 16 hours to 3 days essentially all the expansion was destroyed due to the solvation of the skin of the microsphere.

What is claimed is:

1. In a graphic arts medium for selective application to a substrate comprising a polymeric film-forming binder and a volatile solvent vehicle therefor, the improvement comprising dispersing in said medium about 1 to 45 weight percent, based on the non-volatile content of said medium, of thermally expandable thermoplastic poly(vinylidene chloride) microspheres having a particle size of about 0.5 to 300 microns in diameter and containing about 5 to 50 weight percent of a volatile neopentane blowing agent, said microspheres being insolubilized in said volatile solvent vehicle by a coating of a compound which preferentially wets the surface of said microspheres, said compound being a member selected from the group consisting of alkyl alcohols having about 3 to about 5 carbon atoms in the alkyl chain.

2. The graphic arts medium of claim 1 wherein said alkyl alcohol is coated on the surface of said microspheres in an amount of from about 1 to about 100 weight percent, based on the weight of the microspheres.

3. The graphic arts medium of claim 1 wherein said alkyl alcohol is coated on the surface of said microspheres in an amount of from about 5 to 20 weight percent, based on the weight of the microspheres.

4. The graphic arts medium of claim 3 wherein said alkyl alcohol is butyl alcohol.

5. The graphic arts medium of claim 1 wherein said microspheres have a particle size of about 3 to 50 microns in diameter.

6. The graphic arts medium of claim 1 wherein said microspheres have a particle size of about 5 to 20 microns in diameter.

7. The method of forming a raised graphic pattern upon a substrate which comprises selectively applying in a pattern to said substrate a graphic arts medium comprising a polymeric film-forming binder and a volatile solvent vehicle therefor, said medium having dispersed therein about 1 to 45 weight percent, based on the non-volatile content of said medium, of thermally expandable thermoplastic poly(vinylidene chloride) microspheres having a particle size of about 0.5 to 300 microns in diameter and containing about 5 to 50 weight percent of a volatile neopentane blowing agent, said microspheres being insolubilized in said volatile solvent vehicle by a coating of a compound which preferentially wets the surface of said microspheres, said compound being a member selected from the group consisting of alkyl alcohols having about 3 to about 5 carbon atoms in the alkyl chain, drying said medium and heating to expand said microspheres, whereby said medium forms a raised graphic pattern.

8. The method of claim 7 wherein said alkyl alcohol is coated on the surface of said microspheres in an amount of from about 1 to about 100 weight percent, based on the weight of the microspheres.

9. The method of claim 7 wherein said alkyl alcohol is coated on the surface of said microspheres in an amount of from about 5 to 20 weight percent, based on the weight of the microspheres.

10. The method of claim 9 wherein said alkyl alcohol is butyl alcohol.

11. The method of claim 7 wherein said microspheres have a particle size of about 3 to 50 microns in diameter.

12. The method of claim 7 wherein said microspheres have a particle size of about 5 to 20 microns in diameter.

* * * * *